US010771989B2

(12) United States Patent
Scott

(10) Patent No.: US 10,771,989 B2
(45) Date of Patent: Sep. 8, 2020

(54) ADAPTIVE SELF-OPTIMIZING NETWORK USING CLOSED-LOOP FEEDBACK

(71) Applicant: The Boeing Company, Chicago, IL (US)

(72) Inventor: James P. Scott, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/228,678

(22) Filed: Dec. 20, 2018

(65) Prior Publication Data
US 2020/0205016 A1 Jun. 25, 2020

(51) Int. Cl.
H04W 24/02 (2009.01)
H04W 84/06 (2009.01)
H04B 7/185 (2006.01)

(52) U.S. Cl.
CPC ........ *H04W 24/02* (2013.01); *H04B 7/18513* (2013.01); *H04B 7/18519* (2013.01); *H04W 84/06* (2013.01)

(58) Field of Classification Search
CPC .. H04W 24/02; H04W 84/06; H04B 7/18513; H04B 7/18519
USPC ........................................................ 455/418
See application file for complete search history.

(56) References Cited

U.S. PATENT DOCUMENTS

| 5,898,681 | A | 4/1999 | Dutta |
| 7,177,649 | B1 | 2/2007 | Nielsen |
| 8,712,438 | B1 | 4/2014 | McMullen et al. |
| 2003/0078959 | A1* | 4/2003 | Yeung ........................ G06F 8/62 709/201 |
| 2004/0072539 | A1 | 4/2004 | Monte et al. |
| 2006/0068848 | A1 | 3/2006 | Shapira et al. |
| 2008/0109343 | A1* | 5/2008 | Robinson ............... G06Q 40/04 705/37 |
| 2009/0298554 | A1 | 12/2009 | Kim et al. |

(Continued)

FOREIGN PATENT DOCUMENTS

WO  WO 01/41548  6/2001

OTHER PUBLICATIONS

3GPP Technical Specification 36.902, Release 9, Version 9.3.1, available at http://www.3gpp.org/dynareport/36902. htm, Apr. 7, 2011.

(Continued)

*Primary Examiner* — Inder P Mehra

(57) ABSTRACT

Systems, methods, and apparatus for an adaptive self-optimizing network using closed-loop feedback are disclosed. A method for sharing network resources comprises receiving, by a network operations center (NOC), access requests for users subscribed to an external network. The method further comprises receiving, by the NOC, a summary of key performance indicators from at least one internal network. Also, the method comprises determining, by the NOC, whether at least one internal network has available resources by analyzing the summary of key performance indicators and user demand from the access requests. Further, the method comprises allowing, by the NOC when the NOC determines that there are available resources, at least some of the users from the external network to connect to at least one internal network according to the available resources.

20 Claims, 8 Drawing Sheets

(56) References Cited

U.S. PATENT DOCUMENTS

| | | |
|---|---|---|
| 2010/0309828 A1 | 12/2010 | Nguyen et al. |
| 2011/0244870 A1 | 10/2011 | Lee |
| 2012/0178473 A1 | 7/2012 | Wiren et al. |
| 2012/0208581 A1 | 8/2012 | Ishida et al. |
| 2013/0009809 A1 | 1/2013 | Bert et al. |
| 2013/0244570 A1 | 9/2013 | Park |
| 2014/0011503 A1 | 1/2014 | Du |
| 2014/0036656 A1 | 2/2014 | Chou et al. |
| 2014/0057638 A1 | 2/2014 | Carey et al. |
| 2014/0064247 A1 | 3/2014 | Teyeb et al. |
| 2014/0219255 A1 | 8/2014 | Eyuboglu et al. |
| 2014/0233611 A1 | 8/2014 | Beeler et al. |
| 2015/0036597 A1 | 2/2015 | Chou et al. |
| 2015/0045061 A1 | 2/2015 | Da |
| 2015/0126204 A1 | 5/2015 | Rodriguez Crespo et al. |
| 2015/0147959 A1 | 5/2015 | Ha et al. |
| 2015/0327178 A1 | 11/2015 | Hennelly et al. |
| 2016/0066312 A1 | 3/2016 | Centonza et al. |
| 2016/0095109 A1 | 3/2016 | Scott et al. |
| 2016/0134643 A1* | 5/2016 | Giura ................ H04L 63/1441 726/23 |
| 2016/0183099 A1 | 6/2016 | Frenger et al. |
| 2017/0104677 A1* | 4/2017 | Agarwal ............... G06F 11/079 |
| 2017/0111336 A1* | 4/2017 | Davis ..................... H04L 63/08 |
| 2018/0248973 A1* | 8/2018 | Cook .................... H04L 67/306 |
| 2018/0262422 A1* | 9/2018 | Gerstel .................. H04L 45/22 |
| 2019/0132252 A1* | 5/2019 | Hyoudou ........... H04L 47/2483 |
| 2019/0141162 A1* | 5/2019 | Bohannon .......... H04L 67/2861 |
| 2019/0386957 A1* | 12/2019 | Leon |

OTHER PUBLICATIONS

Extended European Search Report, European Patent Application No. 15187550.7-1855, dated Feb. 24, 2016.

* cited by examiner

ADAPTIVE SELF-OPTIMIZING NETWORK USING CLOSED-LOOP FEEDBACK

CROSS-REFERENCE TO RELATED APPLICATION

This application is related to U.S. patent application Ser. No. 16/228,627, filed on Dec. 20, 2018, the entire disclosure of which is expressly incorporated by reference herein.

FIELD

The present disclosure relates to networks, such as mobile wireless (e.g., cellular, satellite, tactical military, etc.) networks. In particular, the present disclosure relates to adaptive self-optimizing networks using closed-loop feedback.

BACKGROUND

Currently, configurations (e.g., payload configurations) of mobile networks are changed manually according to changing user demand for network resources (e.g., loading patterns), ambient environmental conditions, and/or system performance (e.g., including failures). In particular, a network access node's configuration is changed by a network operations center (NOC) manually generating and sending payload configuration command signals to the access node. This conventionally used, manual procedure is very tedious and time consuming for the network operator. In addition, since this conventional procedure is manually-driven and does not incorporate closed-loop feedback, there is no self-organization and self-optimization capability that would allow the network to dynamically change its configuration to adapt to changing user locations and loading patterns.

In light of the foregoing, there is a need for an improved technology for adapting configurations to adapt the network to changes in user mobility and capacity demands.

SUMMARY

The present disclosure relates to a method, system, and apparatus for an adaptive self-optimizing network using closed-loop feedback. In one or more embodiments, a method for an adaptive network of network access nodes comprises receiving, by a global network operations center (GNOC), operator inputs. The method further comprises generating, by the GNOC, a global policy according to the operator inputs. Also, the method comprises generating, by the GNOC and/or a distributed network gateway (GW), configuration commands for configurations for at least one of the network access nodes based on the global policy. In addition, the method comprises transmitting, by the GNOC and/or the distributed network GW, the configuration commands to at least one of the network access nodes. Additionally, the method comprises transmitting, by the distributed network GW, a summary of key performance indicators to the GNOC. Also, the method comprises revising, by the GNOC, the global policy according to the summary of key performance indicators. Further, the method comprises repeating steps of the method above that follow the generating of the global policy by the GNOC.

In one or more embodiments, the method further comprises generating, by a regional network operations center (RNOC), a regional policy. In at least one embodiment, the method further comprises revising, by the GNOC, the global policy according to the regional policy. In some embodiments, the regional policy comprises admission control, mobility management, channel allocations, carrier allocations, bearer allocations, power management, and/or forward and/or return (FWD/RTN) scheduling policies. In one or more embodiments, the RNOC is located within a distributed network gateway (GW).

In at least one embodiment, the GNOC is located within a distributed network gateway (GW). In some embodiments, the global policy comprises beam allocations, capacity allocations, software-defined network (SDN) management, and/or admission control policy. In one or more embodiments, the operator inputs comprise frequency spectrum planning, traffic planning, and/or contingency plans. In some embodiments, the key performance indicators comprise subscriber demand, MODEM power profiles, beam and carrier (beam/carrier) utilization, session blocking rates, random access channel (RACH) success rates, bearer success rates, session setup latency statistics, and/or handover success rates.

In one or more embodiments, the network access nodes are space vehicles, high-altitude platforms, airborne vehicles, terrestrial vehicles, marine vehicles, or fixed terrestrial cellular or wireless base stations. In at least one embodiment, the space vehicles are satellites. In some embodiments, the satellites comprise a geosynchronous earth orbit (GEO) satellite constellation, a low earth orbit (LEO) satellite constellation, a medium earth orbit (MEO) satellite constellation, a supersynchronous GEO satellite constellation, or a hybrid satellite constellation comprising one or more constellations or constellation types.

In at least one embodiment, the method further comprises generating, by the GNOC and/or the distributed network GW, extensible markup language (XML) models for the configurations for at least one of the network access nodes according to the global policy. In some embodiments, the method further comprises generating, by the GNOC and/or the distributed network GW, the configuration commands according to the XML models.

In one or more embodiments, the method further comprises transmitting, by at least one of the network access nodes, telemetry to the GNOC and/or the distributed network GW.

In at least one embodiment, a system for an adaptive network of network access nodes comprises a global network operations center (GNOC) configured to receive operator inputs, to generate a global policy according to the operator inputs, to generate configuration commands for configurations for at least one of the network access nodes based on the global policy, and to revise the global policy according to a summary of key performance indicators. The system further comprises a distributed network gateway (GW) configured to transmit the summary of key performance indicators to the GNOC. In one or more embodiments, the distributed network gateway (GW) and/or the GNOC are further configured to transmit the configuration commands to at least one of the network access nodes.

In one or more embodiments, the system further comprises a regional network operations center (RNOC) configured to generate a regional policy. In some embodiments, the GNOC is further configured to revise the global policy according to the regional policy.

In at least one embodiment, a method for configuring a configuration for a network access node comprises generating XML models for the configuration for the network access node. The method further comprises generating configuration commands for the network access node according to the XML models. Further, the method comprises configuring the configuration for the network access node according to the configuration commands. In some embodiments, the XML models are generated according to a global policy.

In one or more embodiments, a method for sharing network resources comprises receiving, by a network operations center (NOC), access requests for users subscribed to an external network. The method further comprises receiving, by the NOC, a summary of key performance indicators from at least one internal network. Also, the method comprises determining, by the NOC, whether at least one internal network has available resources by analyzing the summary of key performance indicators and user demand from the access requests. Further, the method comprises allowing, by the NOC when the NOC determines that there are available resources, at least some of the users from the external network to connect to at least one internal network according to the available resources.

In at least one embodiment, the method further comprises connecting at least some of the users from the external network to at least one internal network via at least one user-to-network interface (UNI). In some embodiments, the external network is connected to the at least one internal network via at least one external network-to-network interface (ENNI). In one or more embodiments, the NOC controls operations of the at least one internal network. In at least one embodiment, when there are more than one of the internal networks, the internal networks are connected to each other via at least one internal network-to-network interface (INNI). In some embodiments, users from at least one internal network are connected to the at least one internal network via at least one user-to-network interface (UNI).

In one or more embodiments, the external network and at least one internal network each comprise a vehicle, a router, a network operating system (NOS), an open virtual switch (OVS), a backbone edge bridge (BEB), a backbone core bridge (BCB), a virtual network function (VNF), and/or provider backbone bridging-traffic engineering (PBB-TE). In at least one embodiment, the network access node is a space vehicle, a high-altitude platform, an airborne vehicle, a terrestrial vehicle, a marine vehicle, or a fixed terrestrial cellular or wireless base station. In some embodiments, the space vehicle is a satellite, and the satellite is a geosynchronous earth orbit (GEO) satellite, a low earth orbit (LEO) satellite, a medium earth orbit (MEO) satellite, or a super-synchronous GEO satellite.

In at least one embodiment, a software defined network (SDN) controller of the NOC controls connections of at least one external network-to-network interface (ENNI), at least one internal network-to-network interface (INNI), and at least one user-to-network interface (UNI).

In one or more embodiments, a system for sharing network resources comprises an external network, and at least one internal network. The system further comprises a network operations center (NOC) configured to receive access requests for users subscribed to an external network, to receive a summary of key performance indicators from at least one internal network, to determine whether at least one internal network has available resources by analyzing the summary of key performance indicators and user demand from the access requests, and to allow, when the NOC determines that there are available resources, at least some of the users from the external network to connect to at least one internal network according to the available resources.

In at least one embodiment, at least some of the users from the external network are connected to at least one internal network via at least one user-to-network interface (UNI). In one or more embodiments, the NOC is configured to control operations of the at least one internal network. In one or more embodiments, a software-defined network (SDN) controller of the NOC is configured to control connections of at least one external network-to-network interface (ENNI), at least one internal network-to-network interface (INNI), and at least one user-to-network interface (UNI).

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

Figure 1:
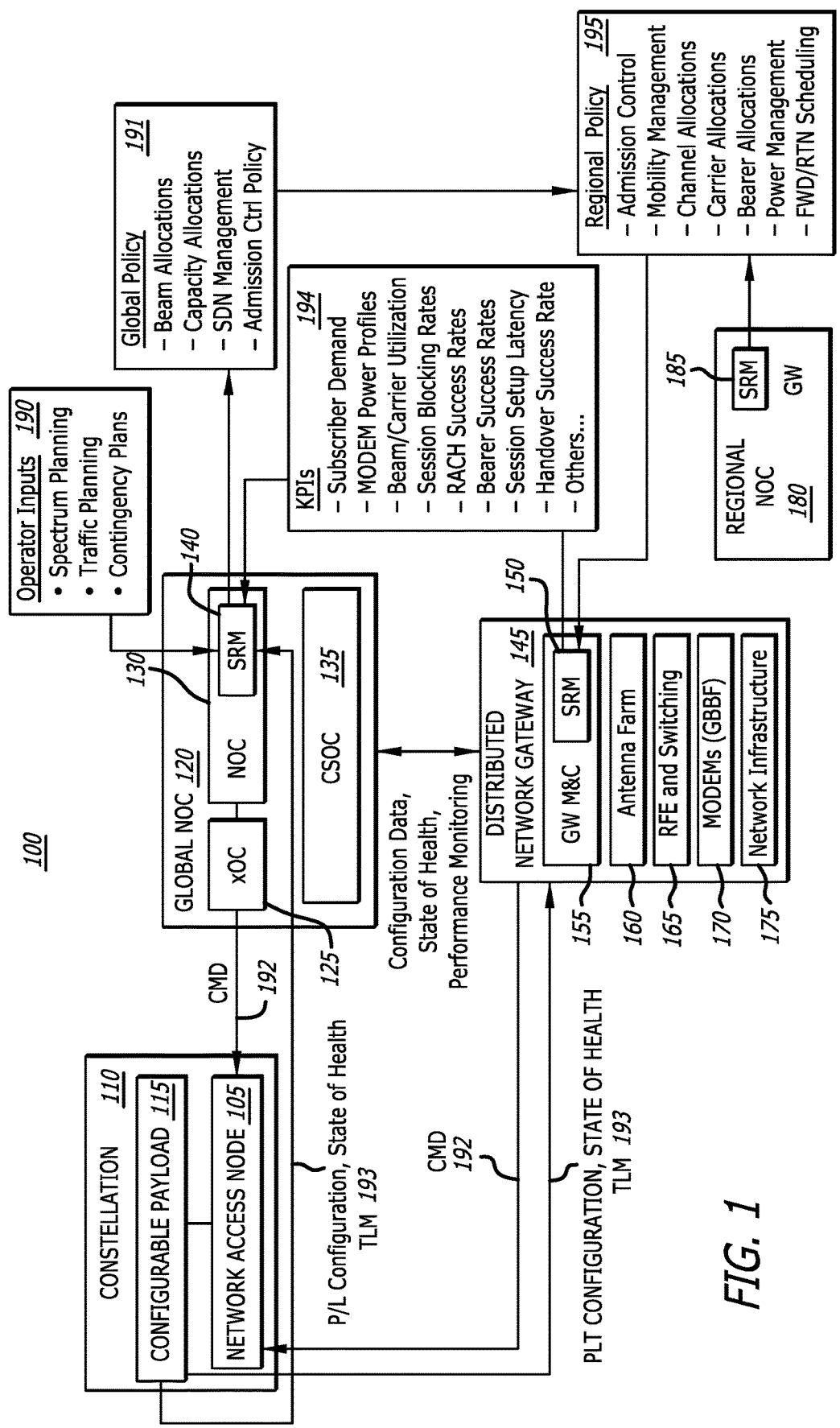
FIG. 1 is a block diagram showing the management architecture for the disclosed system for an adaptive self-optimizing network using closed-loop feedback, in accordance with at least one embodiment of the present disclosure.
Figure 3A:
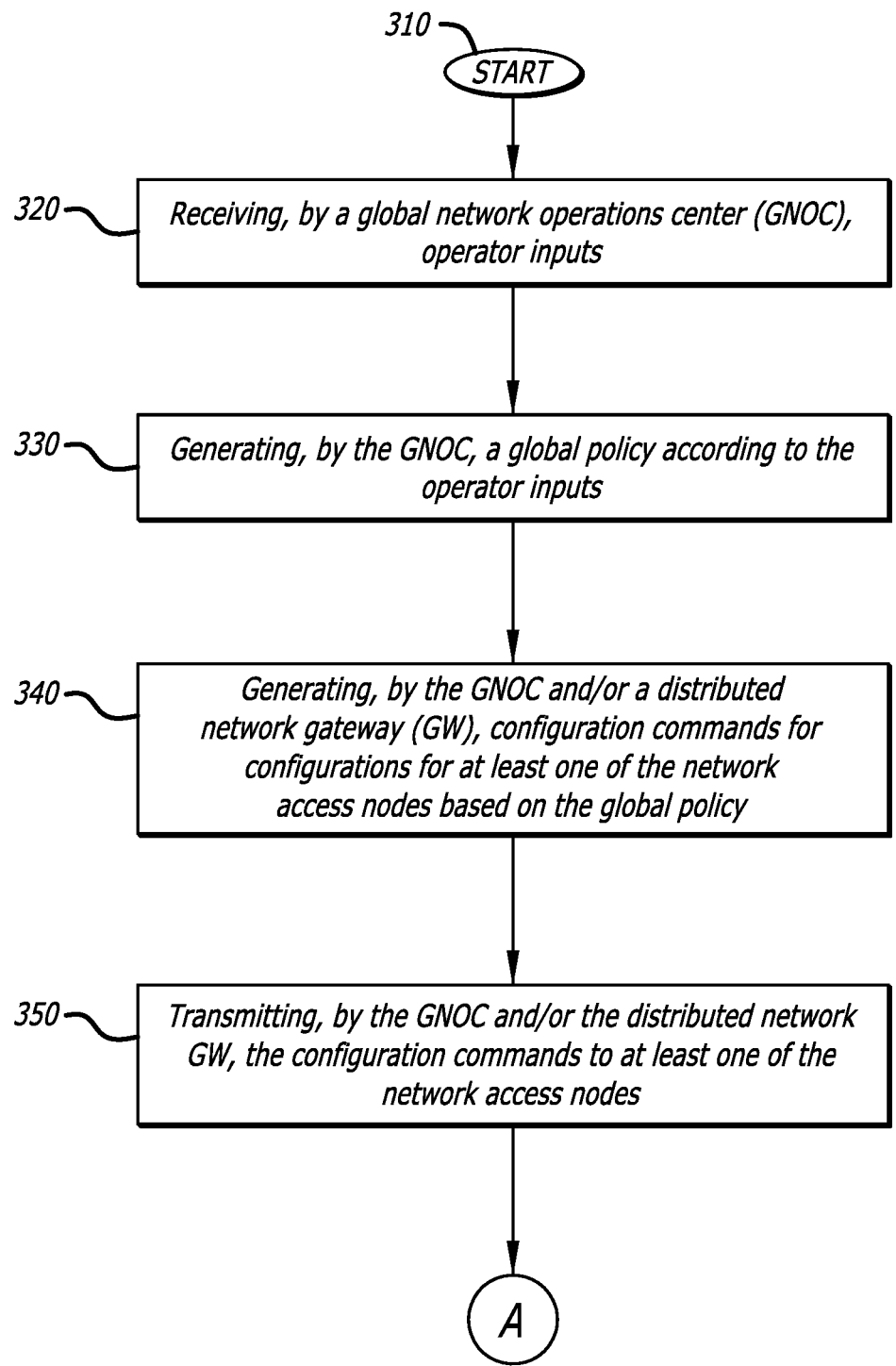
Figure 3B:
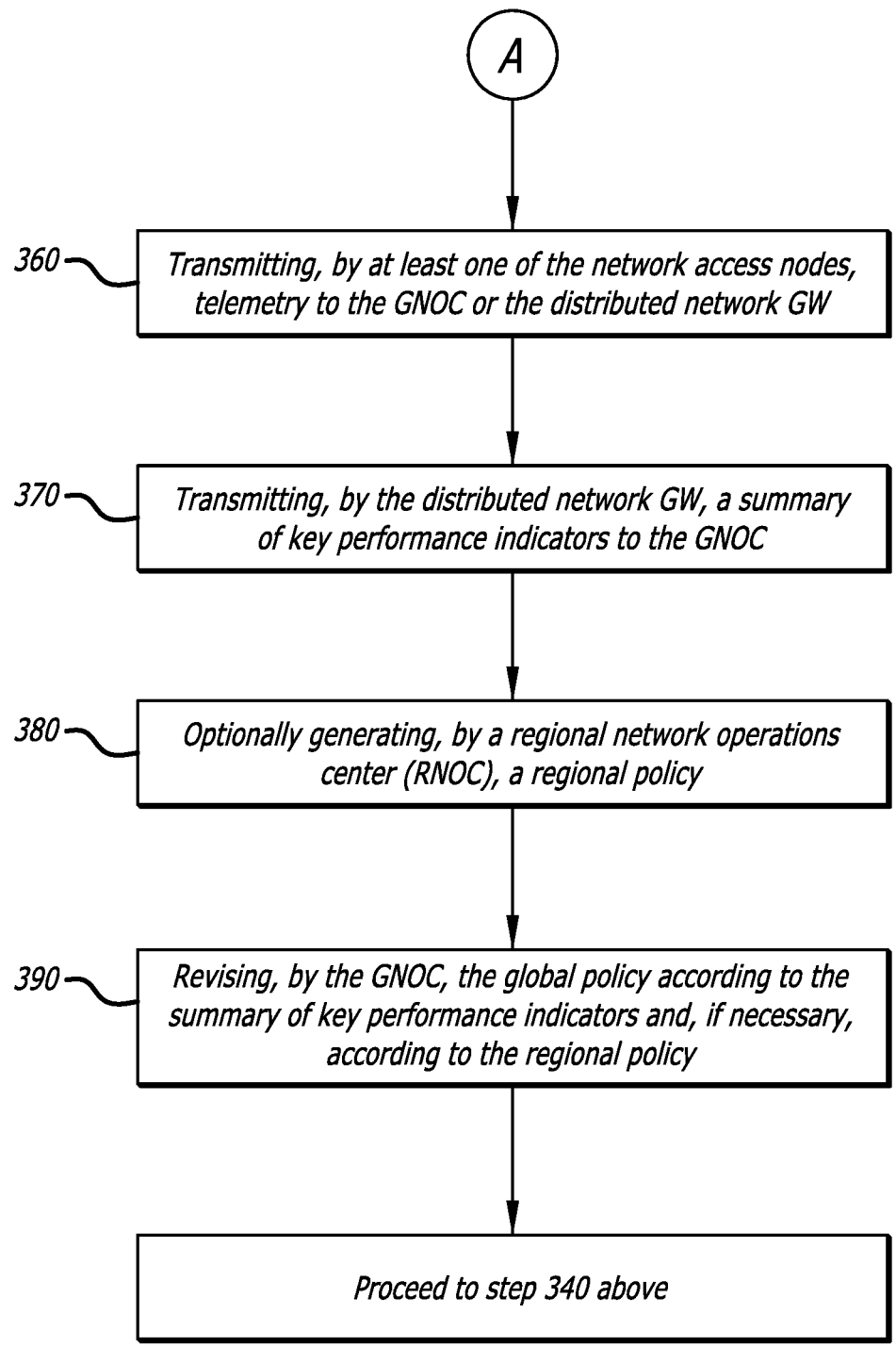

FIGS. 3A and 3B together form a flow chart showing the method for operation of the disclosed system for an adaptive self-optimizing network using closed-loop feedback relating to FIG. 1, in accordance with at least one embodiment of the present disclosure.

Figure 4:
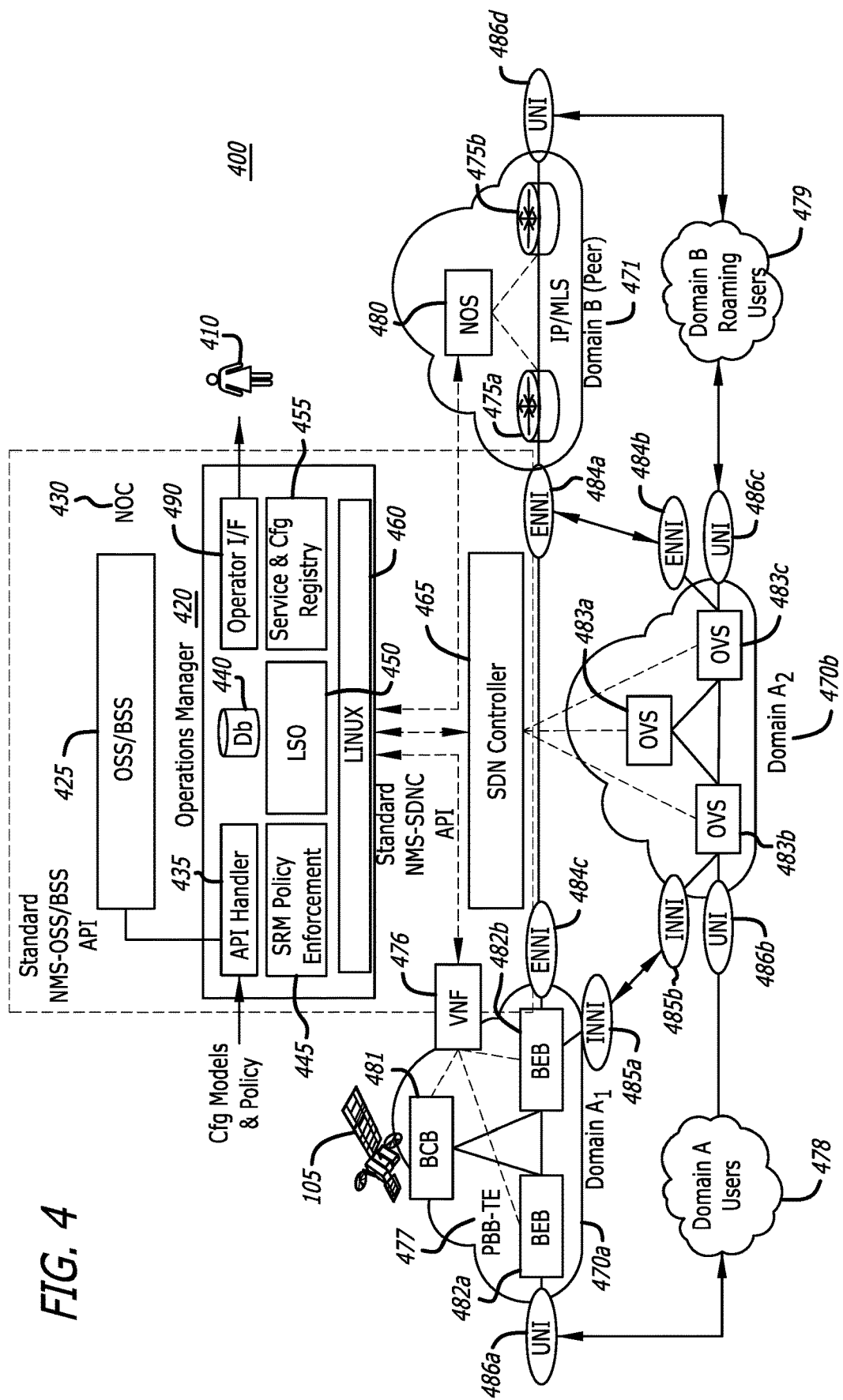

FIG. 4 is a diagram showing the top level architecture for the disclosed system for an adaptive self-optimizing network using closed-loop feedback, in accordance with at least one embodiment of the present disclosure.

Figure 5:
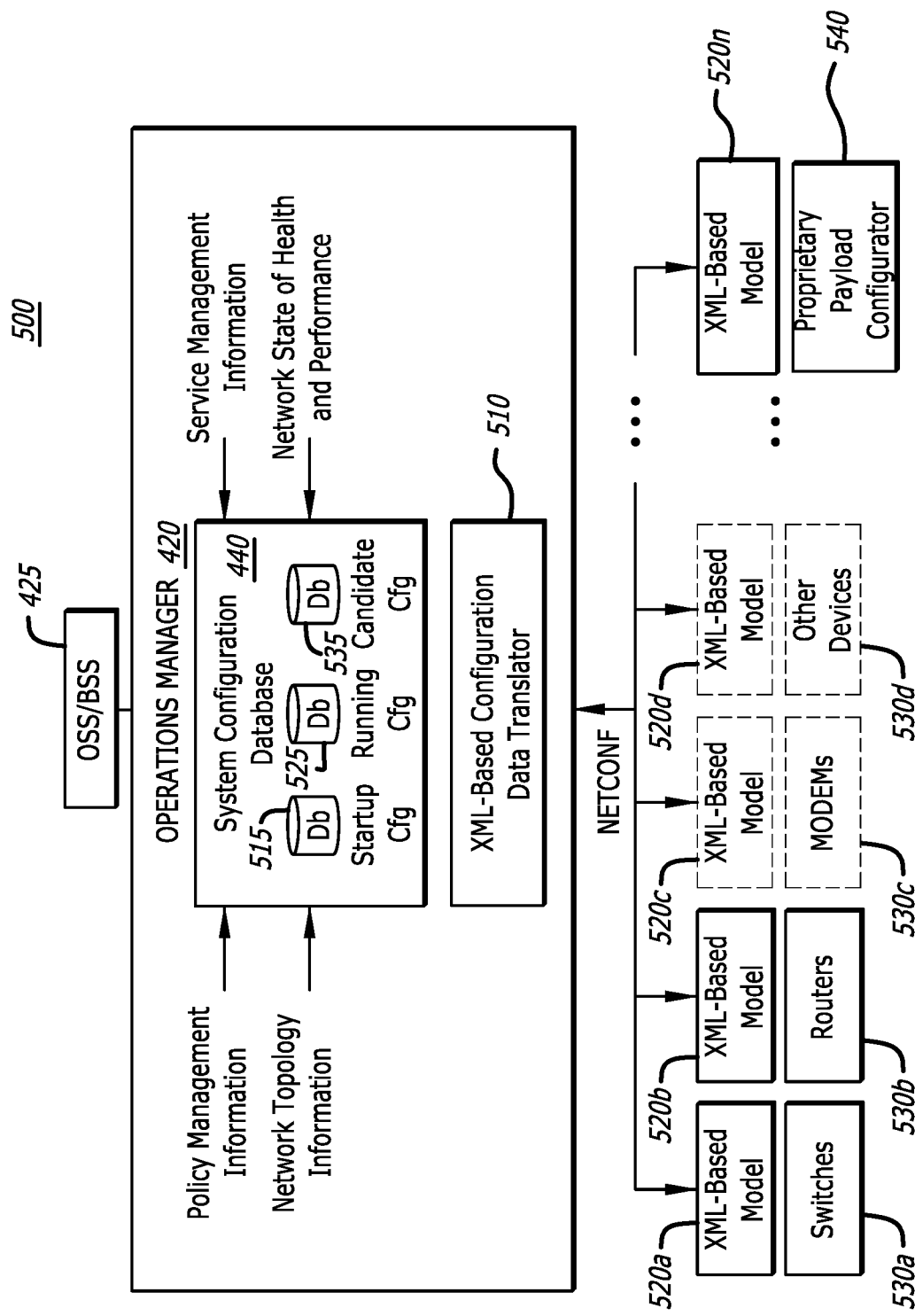

FIG. 5 is a diagram showing further details of the operations manager of FIG. 4, in accordance with at least one embodiment of the present disclosure.

Figure 6:
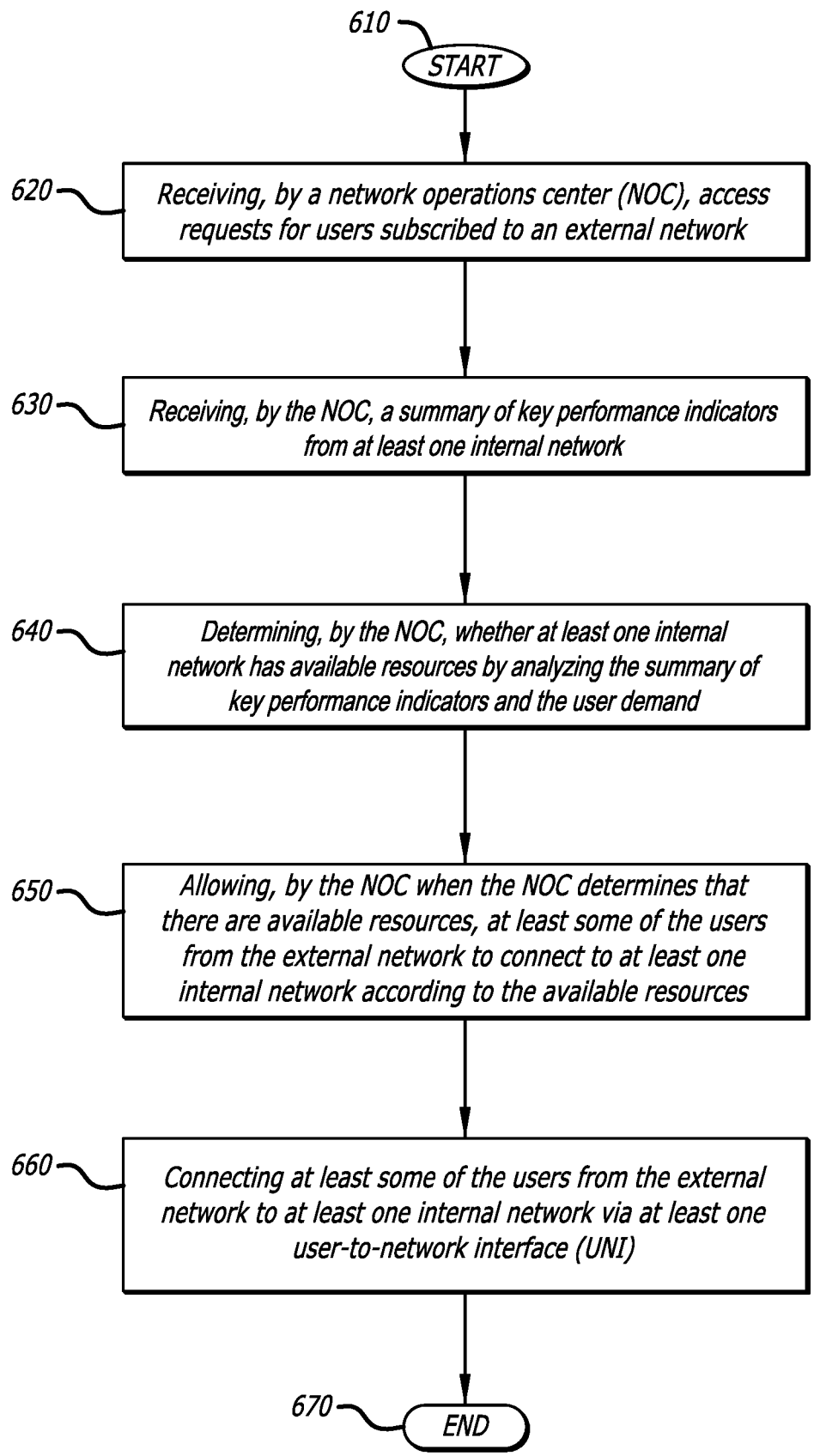

FIG. 6 is a flow chart showing the method for operation of the disclosed system for an adaptive self-optimizing network using closed-loop feedback relating to FIG. 4, in accordance with at least one embodiment of the present disclosure.

Figure 7:
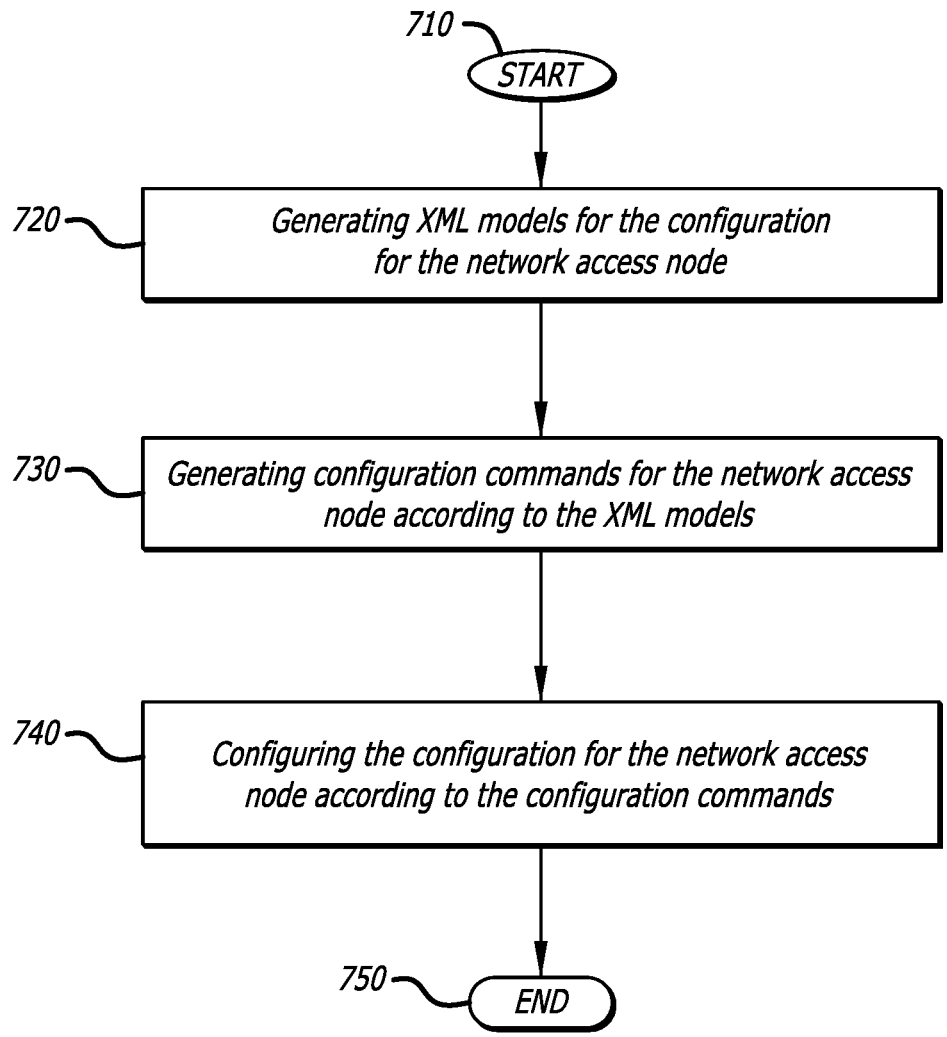

FIG. 7 is a flow chart showing the method for configuring a configuration for a network access node relating to FIG. 5, in accordance with at least one embodiment of the present disclosure.

DESCRIPTION

The methods and apparatus disclosed herein provide an operative system for an adaptive self-optimizing network using closed-loop feedback. In one or more embodiments, the system of the present disclosure provides adaptive, closed-loop management of a network (e.g., a satellite network) in a manner that allows for the network to dynamically adapt to changing user demand for network resources (e.g., loading patterns), ambient environmental conditions, and/or system performance (e.g., including failures). In particular, the disclosed system allows for management of network resources by using closed-loop feedback of real-time statistics pulled from the system.

Specifically, a distributed microservices-based architecture is employed by the system to disseminate a centralized policy (e.g., a global policy) from a global network operations center (GNOC) to a collection of gateways (GWs) (e.g., ground stations) located throughout the system. Additionally, the system employs a system resource manager (SRM) that provides essential functions for connection management, beam management, carrier management, admission control, routing management, signaling management, and/or automated system configuration. The centralized policy, which is disseminated to the gateways, is derived from key performance indicators (KPIs) pulled from various elements of the system to create a closed-loop, adaptive feedback mechanism.

In addition, standards-based protocols and interfaces are employed for evolvability and interoperability of the network. Extensible markup language (XML) based schemas developed to model the network access node's configuration (e.g., satellite payload configuration) are utilized by the system to allow the network access nodes (e.g., satellites) residing in the network (e.g., constellation) to be managed seamlessly as part of the network via an operations manager. The adaptive nature of the disclosed system allows for the network of network access nodes (e.g., satellite constellation) to behave as a self-organizing and self-optimizing network.

The system of the present disclosure has the following advantageous features. Firstly, the system employs adaptive, closed-loop feedback from the network to dynamically self-optimize performance. Secondly, the system provides tight integration of all of the essential functions required for system resource management of a large nodal network (e.g., satellite network). Thirdly, the system provides a reusable framework architecture that can be applied to a single satellite system, a constellation of satellites (e.g., a geosynchronous earth orbit (GEO) satellite constellation, a low earth orbit (LEO) satellite constellation, a medium earth orbit (MEO) satellite constellation, or a supersynchronous GEO satellite constellation, with no inclination or with inclination), or a hybrid satellite constellation comprising multiple different satellite constellations (e.g., a GEO and MEO satellite constellation, a LEO and MEO satellite constellation, or a GEO and LEO satellite constellation). And, fourthly, the disclosed system has the ability to optimize system policy based on dynamic feedback and generate system configuration commands that can be automatically pushed throughout the network in real time.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to networks, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

In various embodiments, the disclosed system for an adaptive self-optimizing network using closed-loop feedback employs a constellation of satellites. It should be noted that the disclosed system for an adaptive self-optimizing network using closed-loop feedback may be employed for network access nodes (e.g., high-altitude platforms, airborne vehicles, terrestrial vehicles, marine vehicles, and/or fixed terrestrial base stations) other than satellites as disclosed herein. The following discussion is thus directed to satellites without loss of generality.

FIG. 1 is a block diagram 100 showing the management architecture for the disclosed system for an adaptive self-optimizing network using closed-loop feedback, in accordance with at least one embodiment of the present disclosure. In this figure, a network access node constellation 110 comprises a system of interconnected configurable network access nodes 105. In one or more embodiments, the network access nodes 105 may be space vehicles (e.g., satellites, high-altitude platforms (HAPs), such as balloons or high-endurance unmanned aerial vehicles (UAVs)), airborne vehicles (e.g., aircraft or unmanned aerial vehicle (UAVs)), terrestrial vehicles (trucks, tanks, or unmanned ground vehicles (UGVs)), marine vehicles (e.g., ships, submarines, or an unmanned underwater vehicles (UUVs)), and/or fixed terrestrial based stations. In some embodiments, when the network access node constellation 110 is a constellation of satellites, the satellite constellation may be a geosynchronous earth orbit (GEO) satellite constellation (with no inclination or with inclination), a low earth orbit (LEO) satellite constellation (with no inclination or with inclination), a medium earth orbit (MEO) satellite constellation (with no inclination or with inclination), a supersynchronous GEO satellite constellation (with no inclination or with inclination), or a hybrid satellite constellation comprising multiple different satellite constellations (e.g., a GEO and MEO satellite constellation, a LEO and MEO satellite constellation, or a GEO and LEO satellite constellation) (with no inclination or with inclination). It should be noted that when the network access nodes 105 are satellites, the satellites will each have a configurable payload 115.

Also in this figure, a global network operations center (GNOC) is shown to comprise an operation center (xOC) 125 (that is unique to the type of network the network access nodes use), a network operations center (NOC) 130, and a cybersecurity operations center (CSOC) 135. The xOC 125, if the network access node 105 is a satellite, maintains the orbit of the satellite, receives tracking and telemetry (e.g., regarding the satellite's location, configuration, and state of health), transmits commands (e.g., satellite bus and payload configuration commands, and manages antenna pointing). The CSOC 135 manages the security of the system (e.g., by detecting, notifying of, and mitigating cyber attacks). The NOC 130 comprises a system resource manager (SRM) 140 that manages the resources of the network of network access nodes.

Also in FIG. 1, at least one distributed network gateway (GW) 145 is shown. Each distributed network GW 145 is associated with at least one network access node 105, and each network access node 105 is associated with at least one distributed network GW 145. Each distributed network GW 145 is shown to comprise an SRM 150 for GW monitoring and control (M&C) 155. In addition, each distributed network GW 145 comprises an antenna farm (e.g., a plurality of transmit and receive antennas) 160, radio frequency equipment (RFE) and switching 165, MODEMs (modulator/demodulator) and optionally a ground-based beamforming (GBBF) network 170, and network architecture/infrastructure 175 (e.g., switches, routers, firewalls, etc.). The GW M&C 155 performs monitoring and control of the state of health of the antennas and RFE, network infrastructure, and/or control of the feederlink antennas of the antenna farm. Each distributed network GW 145 is in communication (via fiber (wire) and/or wirelessly (via satellite)) with the GNOC 120 and may also be in communication (via fiber (wire) and/or wirelessly (via satellite, e.g., by feeder-link)) with its collection of attached network access nodes 105.

In addition, the disclosed system may comprise a regional NOC (RNOC) 180, as is shown in FIG. 1. The RNOC 180 comprises a SRM 185. The RNOC 180 is in communication (via fiber (wire) and/or wirelessly (via satellite)) with the GNOC 120 and/or is in communication (via fiber (wire) and/or wirelessly (via satellite)) with at least one distributed network GW 145.

The GNOC 120 and RNOC 180 may each be co-located with (or within) a distributed network GW. As such, the GNOC 120 and the RNOC 180 may also comprise the same units (e.g., antenna farm 160, RFE and switching 165, MODEMs and optional GBBF 170, and network infrastructure 175) as a distributed network GW 145 as depicted in FIG. 1. As such, the SRM 140 of the GNOC 120 and the SRM 150 of the RNOC may perform GW M&C 155 by monitoring and control of the state of health of the antennas and RFE, network infrastructure, and/or control of the feederlink antennas of the antenna farm.

During operation of the disclosed system, the SRM 140 of the GNOC 120 receives operator inputs 190 from operators (e.g., refer to 410 of FIG. 4). The operator inputs 190 may comprise frequency spectrum planning, traffic planning, and/or contingency plans. The SRM 140 of the GNOC 120 generates a (initial) global policy 191 according to the parameters of the operating inputs 190. The global policy 191 may comprise beam allocations (e.g., the size, shape, location, and power of the antenna beams), capacity allocations (e.g., the location of terminals (users) and user demands), software-defined network (SDN) management (e.g., the routing and signaling policy), and/or admission control policy (e.g., connection admission control (CAC) policy, which dictates the adding or removing of terminals (users)).

After the SRM 140 generates the global policy 191, the SRM 140 of the GNOC 120 and/or an SRM 150 of at least one distributed network GW 145 generates configuration commands 192 for configurations for the configurable payload 115 of at least one network access node 105 in the network access node constellation 110 based on the global policy 191.

It should be noted that in some embodiments, alternatively, an operations manager (refer to 420 of FIG. 5) may generate XML models (refer to 520a, 520b, 520c, 520d, 520n of FIG. 5) for configurations for the configurable payload 115 in accordance with the defined global policy 191. For these embodiments, an XML-based configuration data translator (refer to 510 of FIG. 5) translates the XML models 520a, 520b, 520c, 520d, 520n into flight software commands to generate the payload configuration commands 192. The description of FIG. 5 discusses the details of the use of XML models 520a, 520b, 520c, 520d, 520n to generate the configuration commands 192. It should be noted that the operations manager 420 and the XML-based configuration data translator 510 may be located within the GNOC 120, the RNOC 180, and/or at least one distributed network GW 145. In particular, the operations manager 420 and the XML-based configuration data translator 510 may be located within the SRM 140 of the GNOC 120, the SRM 185 of the RNOC 180, and/or the SRM 150 of at least one distributed network GW 145.

After the configuration commands 192 have been generated, the xOC 125 of the GNOC 120, the RNOC 180, and/or at least one distributed network GW 145 transmits the configuration commands (CMD) 192 to at least one network access node 105 to configure the payload 115 of the network access node(s) 105 accordingly. After the network access node(s) 105 receives the configuration commands 192, the configuration commands 192 command the payload 115 of the network access node(s) 105 to configure the payload 115 according to the configuration(s) contained within the configuration commands 192.

After the payload 115 of the network access node(s) 105 has configured according to the configuration commands 192, the network access node(s) 105 will transmit telemetry (TLM) (e.g., comprising the payload 115 configuration, monitoring information, and the state of health of the network access node 105) 193 to the xOC 125 of the GNOC 120, the RNOC 180, and/or at least one distributed network GW 145.

Then, at least one distributed network GW 145 and/or the RNOC 180 will transmit a summary of key performance indicators (KPIs) 194, which are obtained from at least one network access node 105 to the GNOC 120. The summary of KPIs 194 may comprise subscriber demand, MODEM power profiles, beam and carrier (beam/carrier) utilization, session blocking rates, random access channel (RACH) success rates (e.g., the success rates of the RACH procedure used to allow user terminals to discover and negotiate access to the system), bearer success rates (e.g., the success rates of bearer requests), session setup latency (e.g., length of time to establish a link), and/or handover success rate (e.g., the success rates for beam-to-beam, inter-network access node (e.g., satellite-to-satellite), inter-gateways (e.g., GW-to-GW), and/or inter-network (e.g., internal-to-internal network or external-to-external network, also referred to as roaming) handover).

In some embodiments, optionally, the RNOC 180 will generate a regional policy 195. The regional policy 195 may comprise admission control, mobility management, channel allocations, carrier allocations, bearer allocations, power management, and/or forward and/or return (FWD/RTN) scheduling (e.g., downlink/uplink scheduling for user terminals). For these embodiments, the RNOC 180 will transmit the regional policy 195 to the GNOC 120, either directly or via at least one distributed network GW 145.

After the GNOC 120 has received the summary of KPIs 194, the GNOC 120 may revise (update) the global policy 191 according to the summary of KPIs 194 and, if necessary, according to the regional policy 195, in order to dynamically adapt resource allocations to changes in the aggregate subscriber demand.

After the GNOC 120 has revised the global policy 191, the operation of the system repeats the steps following the GNOC 120 initially generating the global policy 191. As such, the network of network access nodes 105 is self-optimizing by using closed-loop feedback of KPIs 194 (and optionally the regional policy 195) provided by at least one distributed network GW 145 and/or the RNOC 180.

Figure 2:
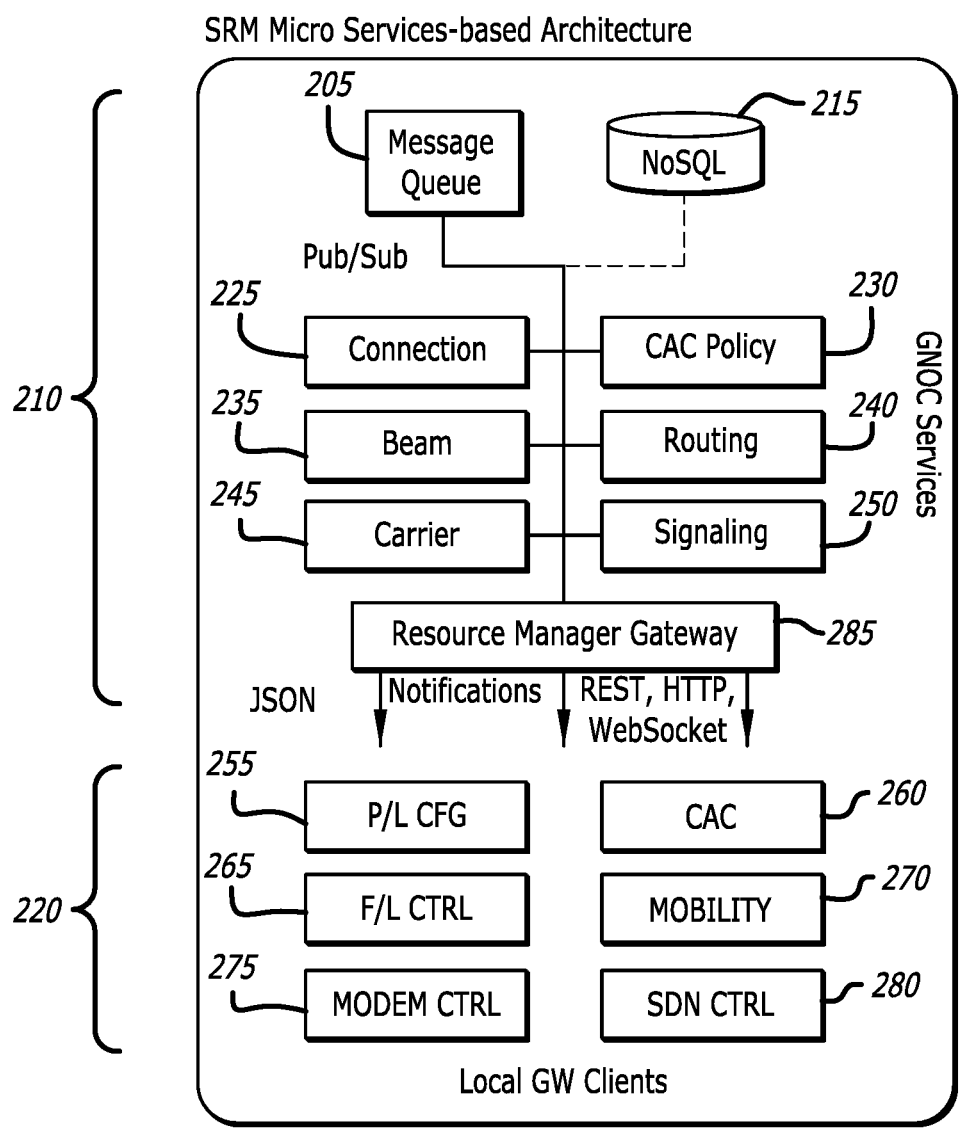
FIG. 2 is a block diagram showing the distributed functional architecture for the disclosed system for an adaptive self-optimizing network using closed-loop feedback, in accordance with at least one embodiment of the present disclosure.

FIG. 2 is a block diagram 200 showing the distributed functional architecture for the disclosed system for an adaptive self-optimizing network using closed-loop feedback, in accordance with at least one embodiment of the present disclosure. In this figure, GNOC functions 210 and distributed network GW functions 220 are illustrated. The GNOC functions 210 are functions of the GNOC 120 (refer to FIG. 1), and the distributed network GW functions 220 are functions of at least one distributed network GW 145 (refer to FIG. 1) and/or the RNOC 180 (refer to FIG. 1). As shown in this figure, the GNOC functions 210 comprise a message queue 205 and a non-structured query language (NoSQL) database 215. In addition, the GNOC functions 210 comprise connection management 225 (e.g., for establishing connections from a user terminal to a network access node 105 within view of the user terminal and to a distributed network GW 145 through the network access node 105), beam management 235 (e.g., controlling the beamformer, which is physically located either within the network access node 105 or within a distributed network GW 145), and carrier management 245 (e.g., controlling the MODEM carriers within a beam). The GNOC functions 210 also comprise a connection admission control (CAC) policy 230 (e.g., a network configuration policy (e.g., the global policy 191) generated based on user demand and available resources), routing management 240 (e.g., controlling the routing of the signal traffic through the network), and signaling management 250 (e.g., setting up sessions for the routing).

Also in this figure, a resource manager gateway 285 allows for the GNOC 120 to communicate with a distributed network GW 145 (or the RNOC 180) via JavaScript Object Notification (JSON) and/or standard web-based interfaces (e.g., represented state transfer (REST), hypertext transfer protocol (HTTP), and/or websocket).

As shown in this figure, the GW functions 220 comprise payload configuration (P/L CFG) 255 (e.g., for configuration of the payload), forward link control (F/L CTRL) 265 (e.g., for controlling the link between the network access node 105 and the distributed network GW 145 (or the RNOC 180)), MODEM control 275 (e.g., controlling the MODEM, which creates the carriers), connection admission control (CAC) 260 (e.g., controlling the adding or removing of user terminals based on the CAC policy 230 (e.g., global policy 191)), mobility 270 (e.g., controlling the handover of network access nodes as they move and/or of user terminals as they move), and software-defined network (SDN) control 280 (e.g., the routing of signals according to the CAC policy 230).

FIGS. 3A and 3B together form a flow chart showing the method for operation of the disclosed system for an adaptive self-optimizing network using closed-loop feedback relating to FIG. 1, in accordance with at least one embodiment of the present disclosure. At the start 310 of the method, a global network operations center (GNOC) receives operator inputs, at step 320. Then, the GNOC generates a global policy according to the operator inputs, at step 330.

The GNOC and/or a distributed network gateway (GW) generate configuration commands for configurations for at least one of the network access nodes based on the global policy, at step 340. Then, the GNOC and/or the distributed network GW transmit the configuration commands to at least one of the network access nodes, at step 350. At least one of the network access nodes then transmits telemetry to the GNOC and/or the distributed network GW, at step 360.

Then, a distributed network GW transmits a summary of key performance indicators (KPIs) to the GNOC, at step 370. Optionally, a regional network operations center (RNOC) generates a regional policy, at step 380. The GNOC then revises the global policy according to the summary of key performance indicators and, if necessary, according to the regional policy, at step 390. Then, the method repeats itself by proceeding back to step 340.

FIG. 4 is a diagram 400 showing the top level architecture for the disclosed system for an adaptive self-optimizing network using closed-loop feedback, in accordance with at least one embodiment of the present disclosure. In this figure, a network operations center (NOC) 430 is shown. The NOC 430 may be a GNOC 120 or a RNOC 180, and may be co-located within a distributed network GW. The NOC 430 is shown to comprise an operational support system/business support system (OSS/BSS) 425 and an operations manager (OM) 420. The operations manager 420 comprises an application programming interface (API) handler 435, a database 440, a SRM policy enforcement module 445, a lifecycle services orchestration (LSO) manager 450, and a service and configuration registry 455. The operations manager 420 further comprises an operator interface (I/F) 490 that is used to provide situational awareness to the NOC 430 and OM 420 access to operators residing within the NOC 430. In addition, the operations manager 420 may operate within the context of a commercial operating system, such as LINUX 460.

The NOC 430 also comprises a software-defined network (SDN) controller 465, which communicates with the operations manager 420 by using a standard network management system-software-defined network controller (NMS-SDNC) application program interface (API).

Also shown in this figure are an external network 471 and internal networks 470a, 470b. It should be noted that the system may comprise more or less than two internal networks 470a, 470b, and/or more than one external network 471 as is shown in this figure. The NOC 430 controls operations of the internal networks 470a, 470b, and the external network 471 is controlled by a different entity.

The external network (Domain B (Peer)) 471 is shown to comprise a network operating system (NOS) 480 and two routers 475a, 475b. In practice, the external network 471 domain may employ alternative architectures than as shown. The NOS 480 and the two routers 475a, 475b are all in communication with each other within the external network 471. Users 479 associated with the external network 471 are connected to the external network 471 via a user-to-network interface (UNI) 486d.

The internal network (Domain $A_1$) 470a is shown to comprise a backbone core bridge (BCB) 481, a virtual network function (VNF) 476, a network access node (e.g., satellite) 105, a provider backbone bridging-traffic engineering (PBB-TE) 477, and two backbone edge bridges (BEBs) 482a, 482b. In practice, the internal network 470a domain may employ alternative architectures than as shown. The BCB 481, VNF 476, network access node 105, PBB-TE 477, and BEBs 482a, 482b are all in communication with each other within the internal network 470a.

The internal network (Domain $A_2$) 470b is shown to comprise three open virtual switches (OVSs) 483a, 483b, 483c. In practice, the internal network 470b domain may employ alternative architectures than as shown. The OVSs 483a, 483b, 483c are all in communication with each other within the internal network 470b. Users 478 associated with the internal networks 470*a*, 470*b* are connected to the internal networks 470*a*, 470*b* via user-to-network interfaces (UNIs) 486*a*, 486*b*.

The external network 471 is connected to internal network 470*a* and to internal network 470*b* via external network-to-network interfaces (ENNIs) 484*a*, 484*b*, 484*c*. Internal network 470*a* is connected to internal network 470*b* via internal network-to-network interfaces (INNIs) 485*a*, 485*b*.

It should be noted that the external network 471 and internal networks 470*a*, 470*b* may each comprise various different components in various different combinations than as shown in FIG. 4. In particular, the external network 471 and the internal networks 470*a*, 470*b* may each comprise at least one of a network access node 105, a router 475, a network operating system (NOS) 480, an open virtual switch (OVS) 483, a backbone edge bridge (BEB) 482, a backbone core bridge (BCB) 481, a virtual network function (VNF) 476, and/or provider backbone bridging-traffic engineering (PBB-TE) 477. The network access node 105 may be a space vehicle, a high-altitude platform, an airborne vehicle, a terrestrial vehicle, or a marine vehicle. In some embodiments, the space vehicle is a satellite, and the satellite is a geosynchronous earth orbit (GEO) satellite, a low earth orbit (LEO) satellite, a medium earth orbit (MEO) satellite, or a supersynchronous GEO satellite.

During operation of the disclosed system, the operations manager 420 of the NOC 430 receives a user demand from the external network 471. The access requests with user demand, which specifies a desired amount of resources (e.g., bandwidth, etc.) from the internal networks 470*a*, 470*b* to be used by (shared with) users 479 associated with the external network 471. The operations manager 420 of the NOC 430 also receives a summary of KPIs from at least one of the internal networks 470*a*, 470*b*.

After the operations manager 420 of the NOC 430 receives the user demand and the summary of KPIs, the operations manager 420 of the NOC 430 analyzes the user demand from the access requests and the summary of KPIs to determine whether at least one of the internal networks 470*a*, 470*b* has available resources that can be shared with the users 479, while maintaining enforcement of pre-existing service contracts with existing users. When the operations manager 420 of the NOC 430 determines that at least one of the internal networks 470*a*, 470*b* has available resources, the operations manager 420 of the NOC 430 will notify the SDN controller 465 of the NOC 430 to allow the users 479 associated with the external network 471 to connect to the internal networks 470*a*, 470*b* according to the available resources. The SDN controller 465 of the NOC 430 will then allow a specific number of users 479 to connect to the internal networks 470*a*, 470*b* according to the amount of available resources. Then, the users 479 that are allowed to connect to the internal networks 470*a*, 470*b* will proceed to connect to the internal networks 470*a*, 470*b* via UNI 486*c*.

It should be noted that the SDN controller 465 of the NOC 430 controls connections (switching) of the ENNIs 484, the INNIs 485, and the UNIs 486 of the system, in addition to intra-domain connectivity.

FIG. 5 is a diagram 500 showing further details of the operations manager 420 of FIG. 4, in accordance with at least one embodiment of the present disclosure. In this figure, the operations manager 420 is shown to comprise the database (e.g., system configuration database) 440 (refer to FIG. 4) and further comprise an XML-based configuration data translator 510. The database 440 comprises a startup configuration (Cfg) database 515, a running configuration database 525, and a candidate configuration database 535. The database 440 receives policy management information, network topology information, service management information, and network state of health and performance information to be stored within its databases 515, 525, 535.

During operation of the disclosed system, the operations manager 420 generates XML models 520*a*, 520*b*, 520*c*, 520*d*, 520*n* for configurations for units (e.g., switches 530*a*, routers 530*b*, MODEMs 530*c*, and other devices 530*d*) for the configurable payload 115 (refer to FIG. 1) according to the global policy 191 (refer to FIG. 1). After the XML models 520*a*, 520*b*, 520*c*, 520*d*, 520*n* have been generated, the XML-based configuration data translator 510 operates as a payload configurator 540, which is a translator to translate the XML models 520*a*, 520*b*, 520*c*, 520*d*, 520*n* into proprietary flight software commands to be used as the configuration commands 192 (refer to FIG. 1).

FIG. 6 is a flow chart showing the method for operation of the disclosed system for an adaptive self-optimizing network using closed-loop feedback relating to FIG. 4, in accordance with at least one embodiment of the present disclosure. At the start 610 of the method, a network operations center (NOC) receives access requests for users subscribed to an external network, at step 620. Then, the NOC receives a summary of key performance indicators (KPIs) from at least one internal network, at step 630. The NOC then determines whether at least one internal network has available resources by analyzing the summary of KPIs and the user demand, at step 640. When the NOC determines that there are available resources (while maintaining enforcement of pre-existing service contracts with existing users), the NOC allows at least some of the users from the external network to connect to at last one internal network to the available resources, at step 650. Then, at least some of the users from the external network connect to at least one internal network via at least one user-to-network interface (UNI), at step 660. Then, the method ends, at step 670.

FIG. 7 is a flow chart showing the method for configuring a configuration for a network access node relating to FIG. 5, in accordance with at least one embodiment of the present disclosure. At the start 710 of the method, XML models are generated for the configuration for the network access node, at step 720. Then, configuration commands are generated for the network access node according to XML models, at step 730. The configuration of the network access node is then configured according to the configuration commands, at step 740. Then, the method ends, at step 750.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A method for sharing network resources, the method comprising:
   receiving, by a network operations center (NOC) that controls operations of at least one internal network, user demand for a desired amount of available resources from the at least one internal network for users from an external network;
   receiving, by the NOC, key performance indicators from the at least one internal network;
   determining, by the NOC, whether the at least one internal network has the available resources by analyzing the key performance indicators and the user demand; and
   allowing, by the NOC when the NOC determines that there are the available resources, at least some of the users from the external network to connect to the at least one internal network according to the available resources.

2. The method of claim 1, wherein the method further comprises connecting at least some of the users from the external network to the at least one internal network via at least one user-to-network interface (UNI).

3. The method of claim 1, wherein the external network is connected to the at least one internal network via at least one external network-to-network interface (ENNI).

4. The method of claim 1, wherein when there are more than one of the at least one internal network, the internal networks are connected to each other via at least one internal network-to-network interface (INNI).

5. The method of claim 1, wherein users from the at least one internal network are connected to the at least one internal network via at least one user-to-network interface (UNI).

6. The method of claim 1, wherein the external network and the at least one internal network each comprise at least one of a vehicle, a router, a network operating system (NOS), an open virtual switch (OVS), a backbone edge bridge (BEB), a backbone core bridge (BCB), a virtual network function (VNF), or provider backbone bridging-traffic engineering (PBB-TE).

7. The method of claim 6, wherein the vehicle is one of a space vehicle, an airborne vehicle, a terrestrial vehicle, or a marine vehicle.

8. The method of claim 7, wherein the space vehicle is a satellite, and wherein the satellite is one of a geosynchronous earth orbit (GEO) satellite, a low earth orbit (LEO) satellite, a medium earth orbit (MEO) satellite, or a super GEO satellite.

9. The method of claim 1, wherein a software defined network (SDN) controller of the NOC controls connections of at least one external network-to-network interface (ENNI), at least one internal network-to-network interface (INNI), and at least one user-to-network interface (UNI).

10. The method of claim 1, wherein the method further comprises controlling connections, by a software-defined network (SDN) controller in communication with the NOC, of network interfaces based on the determining of the NOC that there are the available resources.

11. A system for sharing network resources, the system comprising:
    an external network;
    at least one internal network; and
    a network operations center (NOC) configured to control operations of the at least one internal network, to receive user demand for a desired amount of available resources from the at least one internal network for users from the external network, to receive key performance indicators from the at least one internal network, to determine whether the at least one internal network has the available resources by analyzing the key performance indicators and the user demand, and to allow, when the NOC determines that there are the available resources, at least some of the users from the external network to connect to the at least one internal network according to the available resources.

12. The system of claim 11, wherein at least some of the users from the external network are connected to the at least one internal network via at least one user-to-network interface (UNI).

13. The system of claim 11, wherein the external network is connected to the at least one internal network via at least one external network-to-network interface (ENNI).

14. The system of claim 11, wherein when there are more than one of the at least one internal network, the internal networks are connected to each other via at least one internal network-to-network interface (INNI).

15. The system of claim 11, wherein users from the at least one internal network are connected to the at least one internal network via at least one user-to-network interface (UNI).

16. The system of claim 11, wherein the external network and the at least one internal network each comprise at least one of a vehicle, a router, a network operating system (NOS), an open virtual switch (OVS), a backbone edge bridge (BEB), a backbone core bridge (BCB), a virtual network function (VNF), or provider backbone bridging-traffic engineering (PBB-TE).

17. The system of claim 16, wherein the vehicle is one of a space vehicle, an airborne vehicle, a terrestrial vehicle, or a marine vehicle.

18. The system of claim 17, wherein the space vehicle is a satellite, and wherein the satellite is one of a geosynchronous earth orbit (GEO) satellite, a low earth orbit (LEO) satellite, a medium earth orbit (MEO) satellite, or a super GEO satellite.

19. The system of claim 11, wherein a software defined network (SDN) controller of the NOC is configured to control connections of at least one external network-to-network interface (ENNI), at least one internal network-to-network interface (INNI), and at least one user-to-network interface (UNI).

20. The system of claim 11, wherein the system further comprises a software-defined network (SDN) controller, in communication with the NOC, configured to control connections of network interfaces based on the NOC determining that there are the available resources.

* * * * *